(12) United States Patent
Gifford et al.

(10) Patent No.: US 8,277,918 B1
(45) Date of Patent: Oct. 2, 2012

(54) ALL VEHICLE MATS

(75) Inventors: Quin Gifford, Lombard, IL (US); Judd C. Kaufman, Chicago, IL (US); Scott A. Vargo, Lombard, IL (US); Allan R. Thom, Clarendon Hills, IL (US); Frederick W. Masanek, Jr., Barrington, IL (US); David F. MacNeil, Hinsdale, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 0 days.

(21) Appl. No.: 13/324,814

(22) Filed: Dec. 13, 2011

Related U.S. Application Data

(63) Continuation of application No. 12/234,386, filed on Sep. 19, 2008, now Pat. No. 8,080,302.

(51) Int. Cl.
*B60N 3/04* (2006.01)

(52) U.S. Cl. .......................................... 428/43; 428/156

(58) Field of Classification Search .................... 428/43, 428/156
See application file for complete search history.

(56) References Cited

U.S. PATENT DOCUMENTS

2003/0143358 A1  7/2003  Needles

OTHER PUBLICATIONS

Rubber Mat for the BMX X5 Right Hand Drive E70 (2006), downloaded from http://www.cannoncarmats.com/product_details.php-?pid=1&mid=4... on Apr. 28, 2008.
4×4 Shape 1 Front Pair, downloaded from http://www.cannoncarmats.com/4×4shape1FrontPair-26-d.html on Jun. 25, 2008.

*Primary Examiner* — Alexander Thomas
(74) *Attorney, Agent, or Firm* — Momkus McCluskey, LLC; Jefferson Perkins

(57) ABSTRACT

A cut-to-fit universal vehicle floor mat has arrays of peripheral cells separated from each other and from a central area of the mat body by indented trim lines. The arrays of cells can include one or more of the following: an array adjacent a deadpedal notch, an array for accommodating a gas pedal, an array for a transmission tunnel indentation, an array for a transmission tunnel bulge and an array to fit a passenger's side wheel well. The cells are formed by intersections of the trim lines, and a cell may have convexly curved transition segment between a longitudinal trim line outboard of the cell and a transverse trim line.

11 Claims, 6 Drawing Sheets

ALL VEHICLE MATS

RELATED APPLICATIONS

This application is a continuation of U.S. patent application No. 12/234,386, filed Sep. 19, 2008 now U.S. Pat. No. 8,080,302, assigned to the assignee hereof and the specification and drawings of which are fully incorporated by reference herein.

BACKGROUND OF THE INVENTION

Vehicles have foot wells in which the driver and passenger place their feet. The foot wells are commonly equipped with carpeting. Often, the automotive manufacturers offer floor mats to protect these foot wells. Automotive aftermarket manufacturers also offer floor mats for these foot wells, many of which are customized for the size and shape of foot wells for particular makes and models of cars and trucks, and others of which are meant to fit (somewhat) in a large variety of such makes and models.

Some automotive aftermarket floor mats are so-called "cut to fit" floor mats, by which the consumer is instructed to cut the floor mat to fit his or her vehicle. It is known to provide scribe or cut lines for this purpose.

Even with many such cut or trim lines, the best fit that a consumer is able to achieve still leaves room for improvement. One problem is that while driver's side and passenger side foot wells can take radically different shapes in recent cars, conventional cut-to-fit mats are offered in pairs that either make no accommodation at all for the side of the car in which they are to be used, or at most are mirror images of each other. Further, the presence of numerous ones of such trim or cut lines affects the ability of the mat to conform to the surface it covers, in that each such trim line has a tendency to create a hinged joint at which the mat will preferentially bend, and around which adjacent panels will rotate. Some conventional cut-to-fit offerings merely provide a multitude of uniformly sized rectangular cells with the user choosing which of the cells are to remain with the mat, and which of the cells are to be trimmed off. The result is a trimmed mat with a jagged outline with many sharp internal corners, an outline which is more susceptible to tearing, which is aesthetically suboptimum, and fits to a particular foot well only as a function of how small and numerous the cells are.

SUMMARY OF THE INVENTION

The present invention provides a pair of consumer cut-to-fit vehicle floor mats which are not merely mirror images of each other. Each mat has a central area of a body surrounded by a plurality of peripheral cells which are separated from the central area and from each other by elongate indented trim lines. The consumer may select any of these cells to be trimmed off of the mat or to remain with the mat as trimmed. The number, position and shape of these cells and trim lines is quite different from one mat of the pair to the other, as are the outer margins of the untrimmed bodies.

A driver's side mat of the pair is preferably furnished with a plurality of cells in a gas pedal area in a forward inboard quadrant of the mat, a set of cells for fitting to a transmission tunnel indentation found at the corner of the front and inboard sides of the driver's side foot wells in many vehicles, a preferably two-dimensional deadpedal array of cells spaced from the gas pedal cells and disposed in a forward outboard quadrant of the mat, and a plurality of cells on or near a predicted position of a trunk release lever and/or a fuel filler door lever.

A passenger's side mat of the pair is preferably furnished with a plurality of cells to conform to a transmission tunnel bulge, and a plurality of cells choosable by the consumer to conform to an arcuate right front wheel well that bulges into the passenger's side foot well in many vehicles. Preferably, trim lines defining these last groups of cells are arcuate rather than rectilinear.

In each mat, a general thickness of the mat's central area is thicker than that of the area occupied by the peripheral cells. This aids in conforming the mat to the often curved surfaces of vehicle foot wells.

The driver's side mat and the passenger's side mat thus both exhibit novel and nonobvious characteristics relative to conventional cut-to-fit floor mats when considered alone. A further technical advantage is conferred when these are provided as a pair to a consumer, who then will be able to optimally fit these mats to both foot wells of his or her vehicle.

BRIEF DESCRIPTION OF THE DRAWINGS

Further aspects of the invention and their advantages can be discerned in the following detailed description, in which like characters denote like parts and in which.

DETAILED DESCRIPTION

Figure 1:
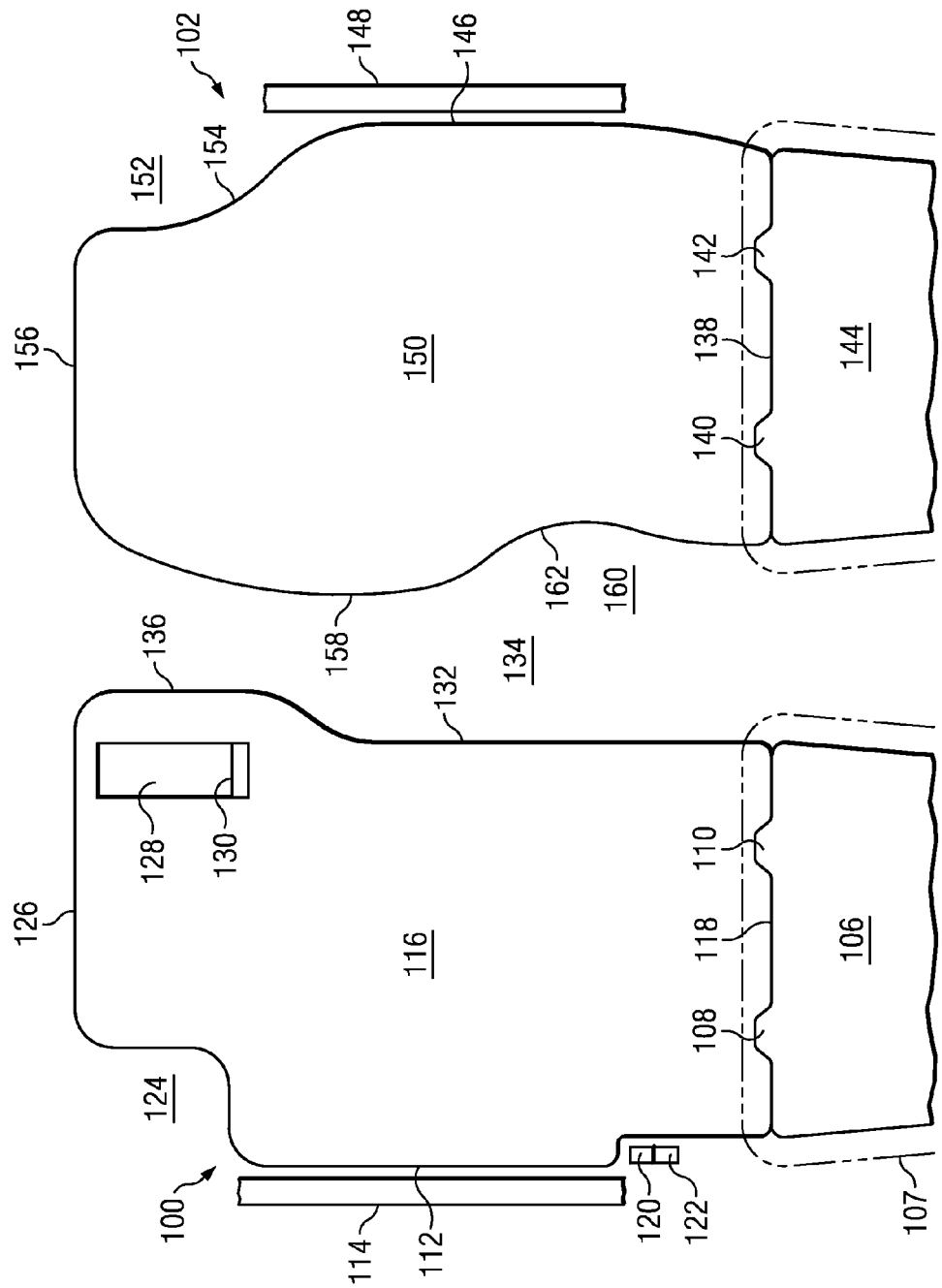
FIG. 1 is a plan view of the driver's side and passenger's side foot wells of a conventional vehicle.

A plan view of a conventional driver's side foot well 100 and passenger side foot well 102 is shown in FIG. 1. As pictured, foot wells 100, 102 are for American or Continental European use, wherein the driver's side is on the left and the passenger's side is on the right. Vehicles for use in countries in which the driver sits on the right and the front-row passenger sits on the left (such as Great Britain) would be reversed from the view shown here.

Recent automobiles and light trucks have fairly strongly delineated foot wells meant to be occupied by the occupants' feet and legs, and surrounded on four sides by other structure. Driver's side foot well 100 will be bounded in an aft direction by a seat pedestal 106, including areas for seat supports 108 and 110. The seat supports 108 and 110 may, in at least some makes and models, extend forwardly from the rest of the seat pedestal 106. Their size and position varies. The outline of a representative seat 107 is shown in dotted line; it may overhang a rear portion of foot well 100. An outboard side 112 of the wheel well 100 may be bounded by a door sill 114 which has an elevation higher than a central floor 116 of the wheel well 100. In the approximate vicinity of the junction of the outboard side 112 and a rear side 118, there may be located a fuel filler door lever 120 and/or a trunk lid release lever 122. These levers 120, 122 of course should be left free to be operated by the user and should not be covered by the mat as trimmed.

Forward of the door sill 114 there will often be a deadpedal 124 located in a forward and outboard corner of the foot well 100. This deadpedal 124 typically is a flat surface, substantially angled to the horizontal, for the placement of a driver's left foot. It is often rectangular in shape. The forward margin 126 of the foot well terminates in a firewall, which begins to slope steeply upward from floor 116.

A gas pedal 128 is positioned underneath the driver's right foot. The gas pedal 128 may be connected via a forward or upwardly tending structural link (not shown) to the firewall at a point well above the foot well floor 116, but instead can be attached at a hinge point 130 to the wheel well floor 116. A brake pedal (not shown) is always disposed in an outboard direction from the gas pedal, but typically does not have any connection to the floor 116.

An inboard side 132 of the foot well 100 is typically defined by a central transmission tunnel 134 which also acts as a divider between the driver's side foot well 100 and the passenger's side foot well 102. In some models, the transmission tunnel 134 has an indentation or narrowing 136 on the driver's side near the forward margin 126.

In recent vehicles the passenger's side foot well 102 is rarely a mirror image of the driver's side foot well 100, and more typically is of significantly different size and shape. It may not be as wide in a transverse or inboard—outboard direction and its bounds or margins tend to be dictated by other structures than those which define foot well 100. A rear margin 138 of the foot well 102 may include a pair of seat pedestal support indentations or areas 140, 142, but these may not be of the same size or be in the same position or spacing as seat pedestal indentations 108 and 110. Sometimes the passenger's seat 144 is structurally different from the driver's seat 106. An outboard margin 146 of the passenger foot well 102 tends to be defined by a passenger's side door sill 148, which again in many instances will be higher than a floor 150 of the foot well 102.

As one proceeds forward, in many instances the outboard margin 146 of the foot well 102 will be defined by a passenger side front wheel well 152, and therefore margin 146 may be defined by an arc 154 which is concave. (For purposes of this Specification, "concave" and "convex" are defined in view of the shape of the mat as trimmed. "Concave" means "bulging inward", from a center of curvature located farther from the center of the mat than the curve itself, and "convex" means "bulging outward", with a center of curvature of the arc located more toward the center of the mat than the curve itself) The arc 154 will take one of many shapes depending on the make and model of the vehicle. The arc 154 will terminate at a forward margin 156 of the foot well 102, which usually is defined by the vehicle's firewall. In some makes the length of the passenger side foot well 102 in a longitudinal direction (that is, the direction of vehicle travel; toward the top and bottom in this FIGURE) may be shorter or longer than the foot well 100 on the driver's side. This is another asymmetry between the driver's and passenger's sides that preferably is accommodated by a pair of cut-to-fit mats that are sized and shaped differently from each other.

An inboard margin 158 of the foot well 102 is typically defined by transmission tunnel 134—but its shape may not be the same as driver's side foot well margin 132. In many vehicles, a four-wheel drive or transaxle hump 160 may cause an outboard-extending bulge 162. There is of course variation among different makes and models of vehicles in the existence and size of this bulge 162. As can be seen, simply making a passenger's side floor mat which is a mirror image of the driver's side floor mat will not result in mats which fit both sides well.

Figure 2:
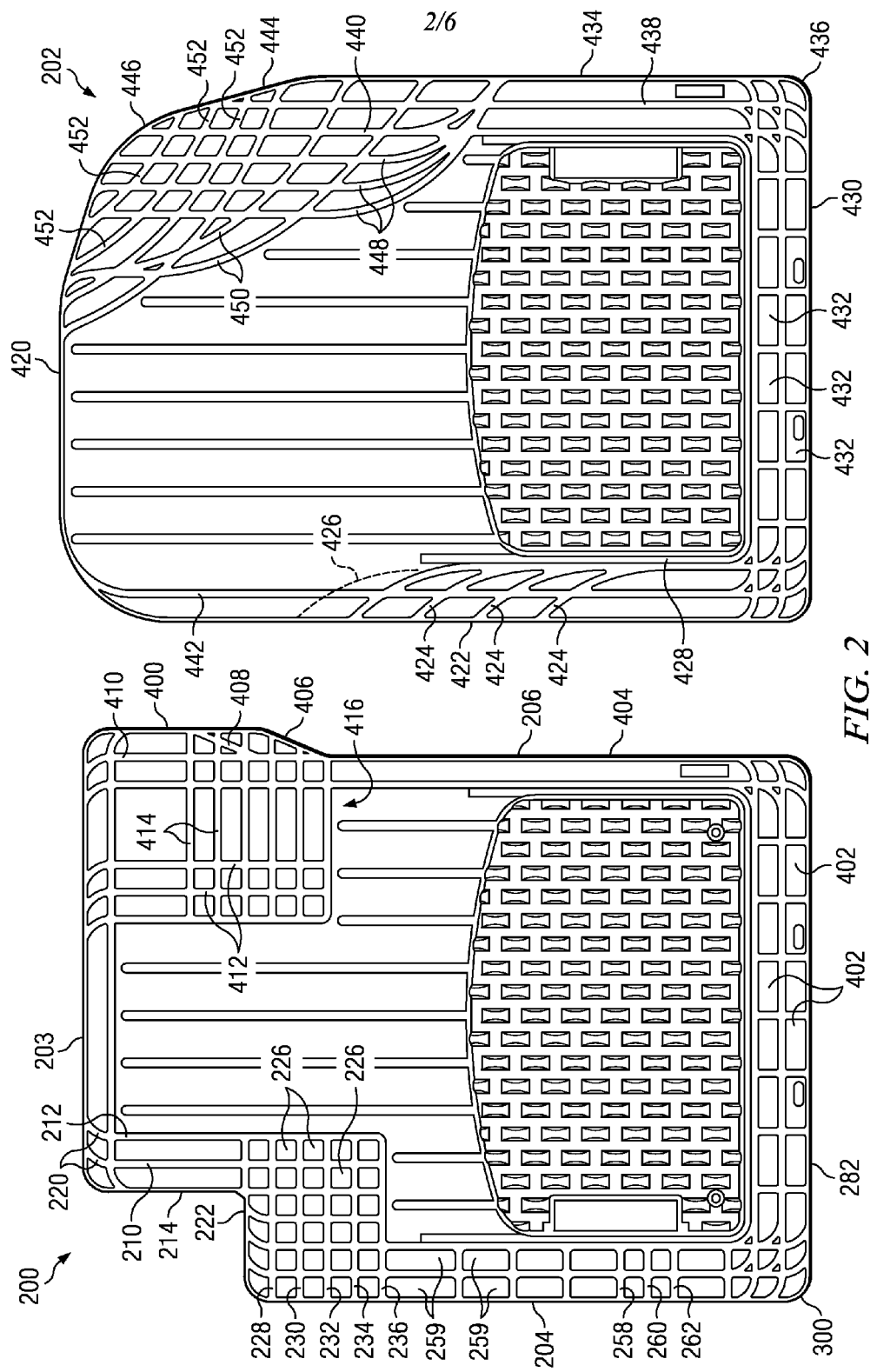
FIG. 2 is an isometric view of a pair of vehicle floor mats which may be trimmed by a consumer to fit into the foot wells of FIG. 1.

Referring to FIG. 2, the present invention provides a pair of mats 200, 202 of distinctly different shapes and having distinctly different sets of trim or cut lines that have been chosen to fit a large number of makes and models of automobiles and light trucks. The inventors have measured the outlines of the foot wells of the most popular makes and models of recent vehicles and have chosen the illustrated shapes and positions of the illustrated trim lines as a result of this research.

The mats 200, 202 are preferably molded from a polymer such as natural or synthetic rubber or a thermoplastic elastomer (TPE). Mats 200, 202 may be molded using injection molding or compression molding techniques.

Driver's side mat 200 has a forward margin 203 which will terminate somewhere on a firewall. The forward margin 203 is joined at its outboard end by a longitudinal margin segment 214, which proceeds aft until it makes an interior corner with a transverse margin segment 222. The margin segment 222 proceeds in an outboard direction until it joins with an outboard margin 204. Margin segments 214, 222 create a cutout for one possible deadpedal. One of the longitudinal cut lines 210, 212 and one of the transverse cut lines 228-236 can be selected to trim the mat 200 to fit the deadpedal areas of other models.

Further aft along margin 204, there is a relatively tight grouping of transverse cut lines 258-262. These lines are positioned such that accommodation can be made for a fuel filler lever, a trunk release lever, or both, commonly found at this location, and still cover the area of the foot well around these typical structures with a fair amount of closeness of fit.

The rear margin 282 is provided with a plurality of cells 402, some of which can be selected for removal in order to accommodate the driver's seat supports or seat pedestal.

An inboard corner of the rear margin 282 is joined to a longitudinally disposed inboard margin segment 404. The inboard corner of forward margin 203 is joined to a margin segment 400 which is parallel to margin segment 404, forward of margin segment 404, and which is offset in an inboard direction from the margin segment 404. Segments 404 and 400 are joined by a diagonal margin segment 406. The bulge created by margin segments 400, 406 will fit a driver's side transmission tunnel indentation present in some vehicle models. A diagonal trim line 408, in parallel to but disposed forwardly from margin segment 406, can be selected to conform to smaller transmission tunnel indentations. Alternatively, the user can trim the mat along longitudinal trim line 410, which is an extension of the margin segment 404, to fit those models which have no such transmission tunnel indentation.

Numerous longitudinal and transverse trim lines 412, 414 are provided in a gas pedal area 416, disposed in a forward and inboard quadrant of the mat, adjacent forward margin 203 and trim line 410, to accommodate a gas pedal or throttle of the sort which hingedly extends from the floor of the foot well.

It will be evident from FIG. 2 that the shape of the passenger's side mat 202 is quite different, and is not merely a mirror image of the driver's side mat 200. A forward margin 420 of mat 200 may be convexly curved rather than straight. At its inboard side the margin curves fairly gradually into a longitudinally disposed inboard margin 422. Along the length of inboard margin 422 are the inboard ends of a family of concavely curved trim lines 424, one of which can be selected by the consumer in fitting the mat 202 to a transaxle bulge of a transmission tunnel. Optionally the mat 202 can have a further, more forwardly disposed arcuate trim line 426 as well. Each of the arcuate trim lines curves inwardly and rearwardly until a longitudinal trim line 428 is met on a tangent thereto.

The inboard margin 422 meets a rear margin 430 at its rear end. Similar to driver's side mat 200, the mat 202 can be provided with a plurality of cells 432 which may be selectively removed for seat supports or the seat pedestal.

The rear margin 430 is joined at its outboard end to an outboard margin 434 by a curved transition 436. The consumer can select margin 434 as the outboard limit of mat 202, or can instead trim the mat along longitudinal cut line 438 or longitudinal trim line 440. Trim lines 438 and 440, in combination with longitudinal trim line 442 disposed on the inboard side of the mat, permit the consumer to size mat 202 to a general width of the passenger's side foot well.

While outboard margin 434 begins as a longitudinal straight line at its aft end, toward its forward end margin 434 begins to curve first through a transition 444, and then through a further curved transition 446 which in turn is joined to forward margin 420. Curved transitions 444, 446 are meant to fit to the outboard limits of passenger's side foot wells in some vehicles, and curve inwardly to accommodate a wheel well of a right front wheel of the vehicle.

But in many vehicles, the right front wheel well makes a concavely arcuate bulge into the passenger's side foot well. For these vehicles, three families of concavely arcuate trim lines 448, 450 and 452 have been provided.

Comparing the two mats 200, 202, it will be evident that the trim lines provided for each in many cases are not repeated on the other side. The deadpedal, gas pedal, fuel filler/trunk release and forward transmission tunnel trim lines found in the driver's side mat 200 are not found in the passenger's side mat 200. Conversely, the transmission tunnel bulge trim lines and the right wheel well trim lines found in passenger's side mat 202 are not found in the driver's side mat 200. The selective provision of these trim line families on one but not the other of mats 200, 202 makes each of them a better fit to an actual vehicle.

Figure 3:
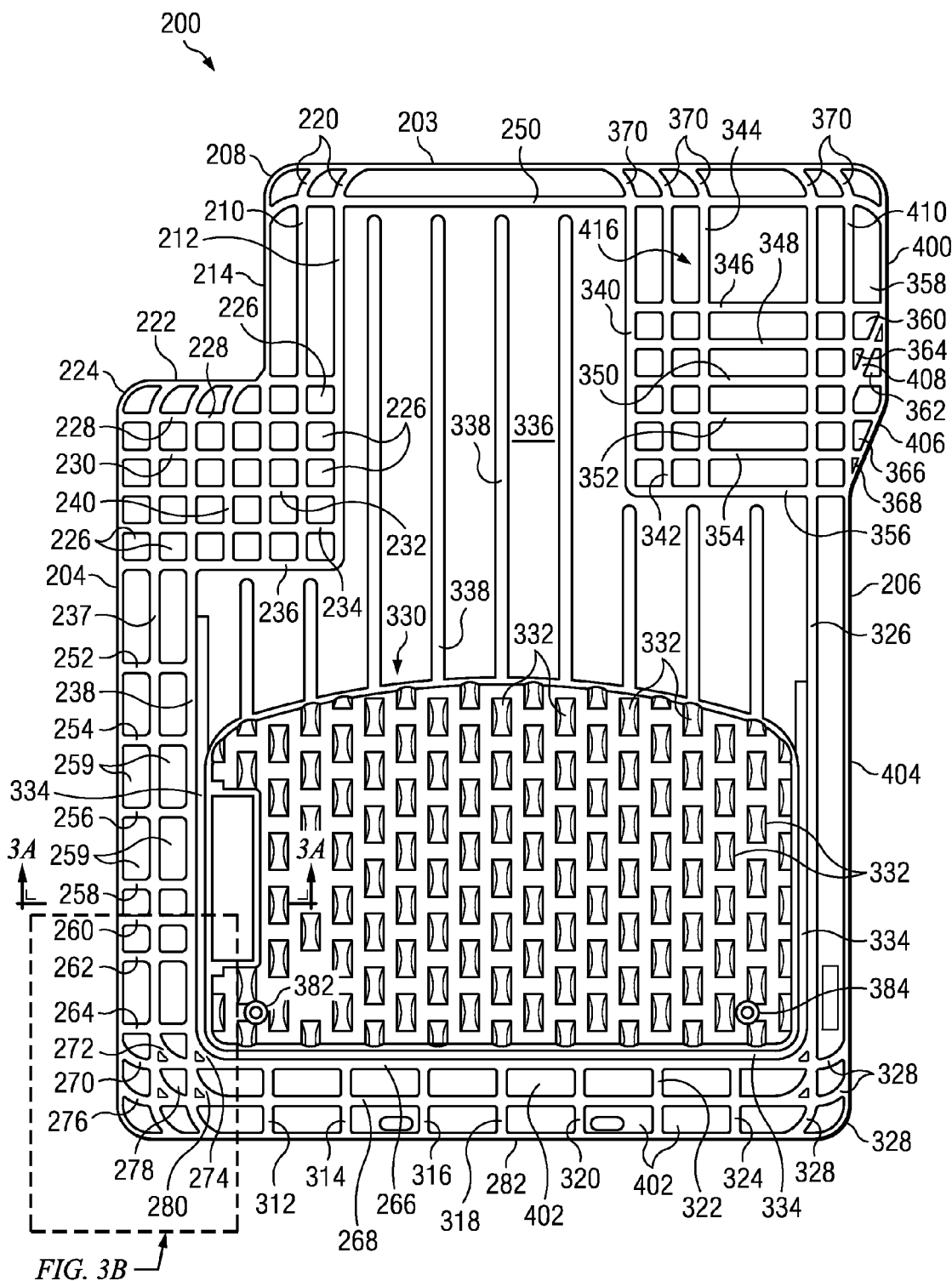
FIG. 3 is a plan view of the driver's side floor mat shown in FIG. 2.

Referring to FIGS. 2 and 3, the driver's side mat 202 is shown in more detail. A transverse trim line 250 is spaced about one inch aft of forward margin 203 and terminates at either end in convexly curved segments in the instance that the user elects to trim off the area of the mat forward of line 250, thereby creating rounded corners in this event. Outboard margin 204 is joined to margin 220 at a curved corner 208 and extends therefrom in a generally aft direction.

A first fore-and-aft set of trim lines 210, 212 run parallel to an outboard margin section 214. Fore and aft trim lines 210, 212 each terminate in a forward direction with a convexly curved segment 220, such that if the user selects one of them to trim the mat, a rounded corner between margin 203 and margin 204 will result. The trim line 210 is spaced in an inboard direction from the margin segment 214 by about one inch. Trim line 212 is spaced in an inboard from trim line 210 by about another inch.

Outboard margin segment 214 is about six inches long and is joined at an aft end thereof with a transverse margin segment 222. Margin segment 222 extends in an outboard direction about four inches to curved corner 224. Margin segments 214 and 222 together are calculated to approximate a first possible outline of a deadpedal area. The deadpedal usually presents a flat surface at a substantial incline to the foot well floor and typically terminates at its inboard side with a clifflike dropoff. Segments 222 and 214 are designed to fit around one such deadpedal area, so that the driver's side mat 200 won't cover it. This will make the rest of the mat 100 better conform to the floor 116 (FIG. 1) particularly in an area adjacent the firewall and forward portion of the outboard margin 204.

A large number of roughly rectangular cells 226 are formed near margins 214 and 222 by the intersection of longitudinal trim lines 210 and 212 and a plurality of transverse trim lines 228, 230, 232, 234 and 236. Transverse trim line 228 is preferably spaced about one inch aft of margin 222, and trim lines 230-236 are spaced at one inch intervals aft of trim line 228. A pair of longitudinal trim lines 237 and 238 is set off in an inboard direction from longitudinal outboard margin 204 by one and two inches, respectively. Longitudinal trim line 240 is spaced by about one inch inboard from trim line 238 but, unlike trim lines 237 and 238, does not extend for more than about five inches from margin 222.

The intersection of these trim lines 210, 212, 237-240 on the one hand, and transverse trim lines 228-236 on the other, create a two-dimensional array of cells 226 in the outboard and forward quadrant of mat 200 which can be selectively trimmed away by a user to fit to deadpedal areas of larger extent that one which would be fit by outer margin segments 214 and 222. The user can cut this area to fit a deadpedal which is up to two inches wider, and/or up to five inches deeper in a longitudinal direction, in one-inch increments. Longitudinal trim lines 237-240 each terminate at their forward end in a curved segment which curves in an inboard direction, permitting the as-trimmed mat to have a rounded corner at this location. The two-dimensional array of deadpedal cells 226 is spaced from the gas pedal cells by a portion of general surface 336, which preferably is thicker, has no trim lines in it, and for both of these reasons is less prone to bending.

Proceeding in an aft direction along outboard margin 204, a transverse trim line 252 is disposed about three inches aft of trim line 236. Transverse trim lines 254, 256 and 258 are disposed at about two inch intervals aft of trim line 252. Each of trim lines 252-258 extends in an inboard direction from margin 204 for about two inches, creating a 2×4 array of cells 259 down the side 204 of mat 200.

Starting at transverse trim line 258 and proceeding in an aft direction, the spacing between adjacent transverse trim lines decreases to about one inch. This is because there are a large number of vehicle models which position a fuel filler door release lever and/or a trunk release lever near this location. The spacing between parallel transverse trim lines 258, 260 and 262 is preferably about one inch. The spacing between transverse trim line 262 and transverse trim line 264 disposed rearwardly of it is preferably about two inches.

Approximately one inch aft of transverse trim line 264 is disposed a trim line 266, which is in general parallel to trim line 264 but which extends across the entire transverse width of mat 200. Trim line 266 has, at its outboard end, a forwardly curving segment 270. A curved segment 272 is provided as a transition between trim line 266 and longitudinal trim line 237. A similar curved segment 274 is provided as a transition between trim line 266 and longitudinal trim line 238.

About one inch aft of trim line 266 is a parallel transverse trim line 268 which extends across the entire width of the mat 200. Like trim line 266, the trim line 268 terminates at either end in a forwardly curved segment, the outboard one of which is curved segment 276. Inboard of this curved segment 276 is a similar curved segment 278, which can act as a rounded corner between trim line 268 and longitudinal trim line 237. Inboard of curved segment 278 is a similar curved segment 280, which can act as a rounded corner between transverse trim line 268 and longitudinal trim line 238.

A rear margin 282 of the mat 200 is curved at both its outboard and inboard ends to provide respective rounded corners to outboard margin 204 and inboard margin 206. At their aft ends, the trim lines 237 and 238 are similarly curved in an inboard direction, to provide smooth transitions to the rear margin 282.

Figure 3A:
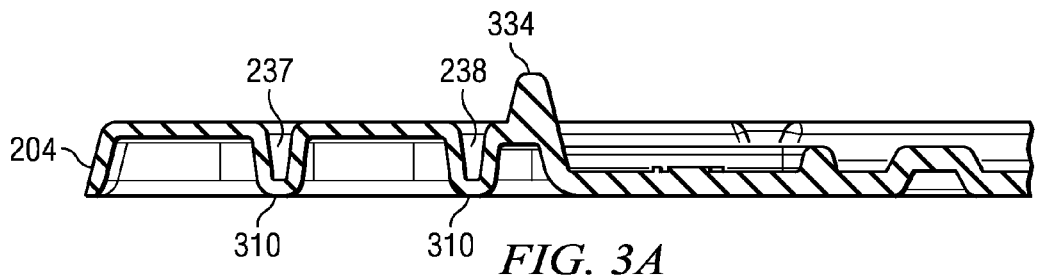
FIG. 3A is a magnified schematic sectional view taken substantially along Line 3A-3A of FIG. 3.
Figure 3B:
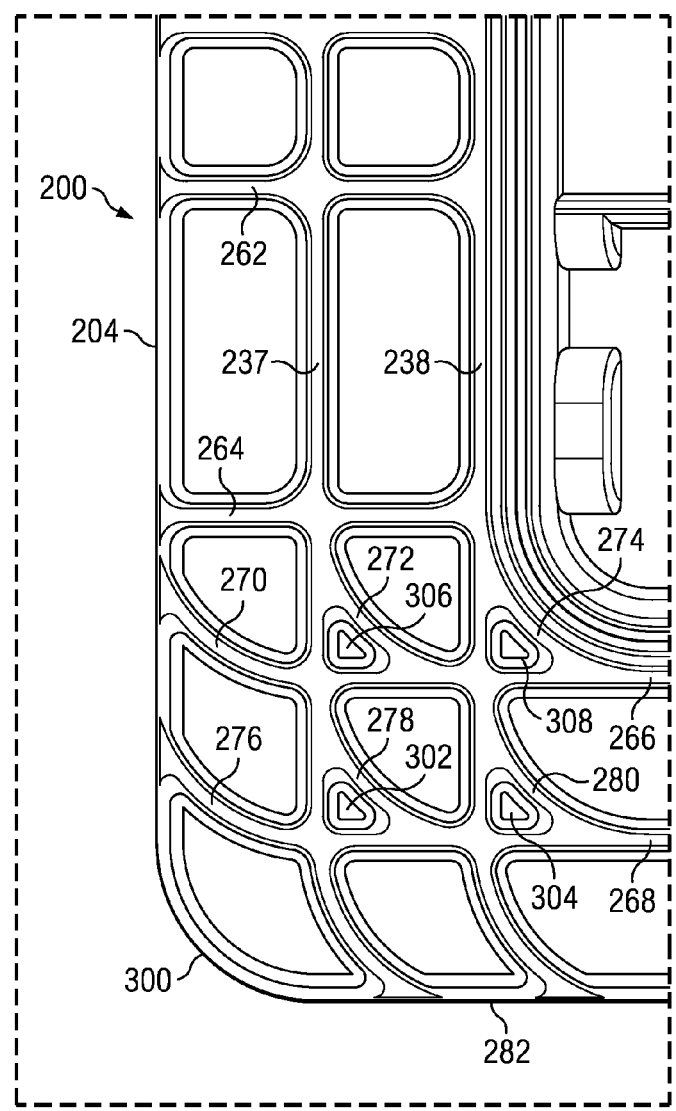
FIG. 3B is a magnified detail of a rear outboard corner of the mat shown in FIG. 3.

FIG. 3B is a detail of the trim lines formed in the mat 200 near rear/outboard corner 300 thereof. In practice, a user will select rear margin 282, transverse trim line 268 or transverse trim line 266 to act as the rear margin of the trimmed mat 200. Similarly, the user will select outboard margin 204, longitudinal trim line 237 or longitudinal trim line 238 as the general outboard margin of the trimmed mat 200. The mat 200 has a curved transition for all possible selectable combinations of longitudinal trim lines/margins and transverse trim lines/margins. Said differently, the mat 200 has a plurality of longitudinal columns and transverse rows of peripheral cells, and the mat 200 provides convexly curved trim line segment for each intersection of these rows and columns occurring near the corners of the untrimmed mat.

In the instance that the user selects one or more of the trim lines 237, 238, 266, 268 to terminate the part, he or she will trim any outboard or aft excess cells at the trim line, typically using a pair of scissors. As also shown in FIG. 3A, each trim line is formed as a deep V-shaped valley to guide the scissor blades during a cutting operation. In further aid of this, the mat 200 is furnished with a set of small, triangular islands 302, 304, 306, 308 (FIG. 3b) to better guide scissors or other cutting implement through a selected pair of transverse and longitudinal trim lines and a curved transition between them.

Returning to FIG. 3, and proceeding in an inboard direction from longitudinal trim line 238, the mat 200 is provided with a series of short longitudinal trim lines 312-324, disposed in parallel to each other and spaced from each other preferably by about 2⅛ inches. Each of the trim lines 312-324 extend from the aft margin 282 to transverse trim line 266. The intersection of longitudinal trim lines 312-324 and transverse trim lines 266 and 268 create an array of cells 402 which can be selectively trimmed away to fit the driver's seat pedestal, and particularly any forwardly protruding seat supports.

Inboard of trim line 324 is a longitudinal trim line 326 which preferably extends for the entire (longitudinal or fore and aft) length of mat 200. Trim line 326 is preferably located about one inch outboard of the margin segment 404. A set of six curved transitions 328 is provided near the aft/inboard corner of mat 200, so that the user will be able to select any of margin 282, transverse trim line 268, and transverse trim line 266, and either of margin segment 404 and trim line 326, and have a rounded corner between the selected aft and inboard trim lines.

Mat 200 preferably has a reservoir area 330 just forward of cell array 402, and laterally interiorly of the outboard and inboard cells. This reservoir area 330 preferably is at least slightly depressed relative to the cells 402, 259, etc. surrounding it. The reservoir area 330 is so positioned that it will persist into the final trimmed mat, regardless of the particular make and model for which mat 200 is trimmed. The reservoir area 330 preferably has a plurality of raised features 332 on which the user's feet can be placed; this elevates the user's footwear above collected rain, water, mud, snowmelt and the like. It is further preferred that the reservoir area 330 be closely bounded on aft, inboard and outboard sides by a rib 334 which assists in retaining water, mud and the like. Forward of the reservoir area 330 is a general surface 336 of the mat which preferably has a series of longitudinally disposed, parallel channels 338. The channels 338 terminate in the reservoir 330 and there will be a tendency for them to channel water into the reservoir 330. Reservoir 330, raised features 332, rib 334 and channels 338 are repeated in the passenger's side mat 202 (FIG. 4), more particularly described below.

The gas pedal area 416 (FIG. 3), occupying a region in the forward inboard quadrant of the mat 200 which is forward and inboard of the rest, more particularly includes a set of relatively short longitudinal trim lines 340, 342 and 344 which do not extend very far aft (in one embodiment, about nine inches from the forward margin 203). The longitudinal trim lines are preferably spaced about one inch apart and intersect with a set of transverse trim lines 346-356 that are spaced apart from each other by about one inch. The transverse trim line 346 preferably is positioned about four inches from front margin 203. Longitudinal trim lines 326 and 410 also define cells in the gas pedal area 416. A transverse trim line 250, spaced about one inch from the forward margin 203, completes the orthogonal two-dimensional array of trim lines in this area.

The transverse trim lines 250, 266 and 268 can be selected as the general outer forward and aft margins of the as-trimmed mat, so as to generally fit the mat 200 to the driver's side foot well of the vehicle. Longitudinal trim lines 326, 237 and 238 can be similarly selected for this purpose.

If the vehicle is one in which the gas pedal hinges to the floor, an L-shaped or U-shaped cutout can be made around the gas pedal by selecting one of trim lines 340, 342 or 344 as the outboard trim line, one of transverse trim lines 346-356 as the aft trim line, and one of trim lines 326, 410 or 400 as the inboard trim line—the selection of the latter two creating an "L" cutout. Inboard and forwardly disposed cells 358-368, all of which are inboard of trim line 410, can be permitted to remain to cover any transmission tunnel indentation occurring in some vehicle models, or alternatively can be partially or completely trimmed away. Each of the longitudinal trim lines 340-344, 326, 410, 400 terminates at its forward end in a curved portion 370, so that if one of these longitudinal lines is selected as an external margin of the trimmed part, a smooth transition to the forward margin 203 will result.

The driver's side mat 200 has a pair of circular retention bosses 382, 384 neat the aft margin 282. The retention bosses are meant to receive upstanding pegs or hooks typically protruding through or molded into the OEM foot well carpeting. As fitted to such pegs or hooks, the mat 200 will not slide forward and will not interfere with operation of the gas pedal or the brake pedal. It is preferred that each retention boss 382, 384 define, with a raised rim, a central hole approximately ½ in. in diameter. It is further preferred that the centers of the retention bosses be about 3½ inches from the aft margin 282 of the untrimmed mat 200, and about 2¾ inches from the nearest one of the inboard or outboard margins 206, 204.

In a preferred embodiment, the retention bosses 382, 384 appear in the driver's side mat only. While retention bosses 382, 384 provide a safety feature, if employed they also impose a constraint on how the mat 200 is fitted to the foot well of the vehicle. Since there is no corresponding safety issue for the passenger's side mat 202, the bosses 382, 384 are intentionally omitted.

Figure 4:
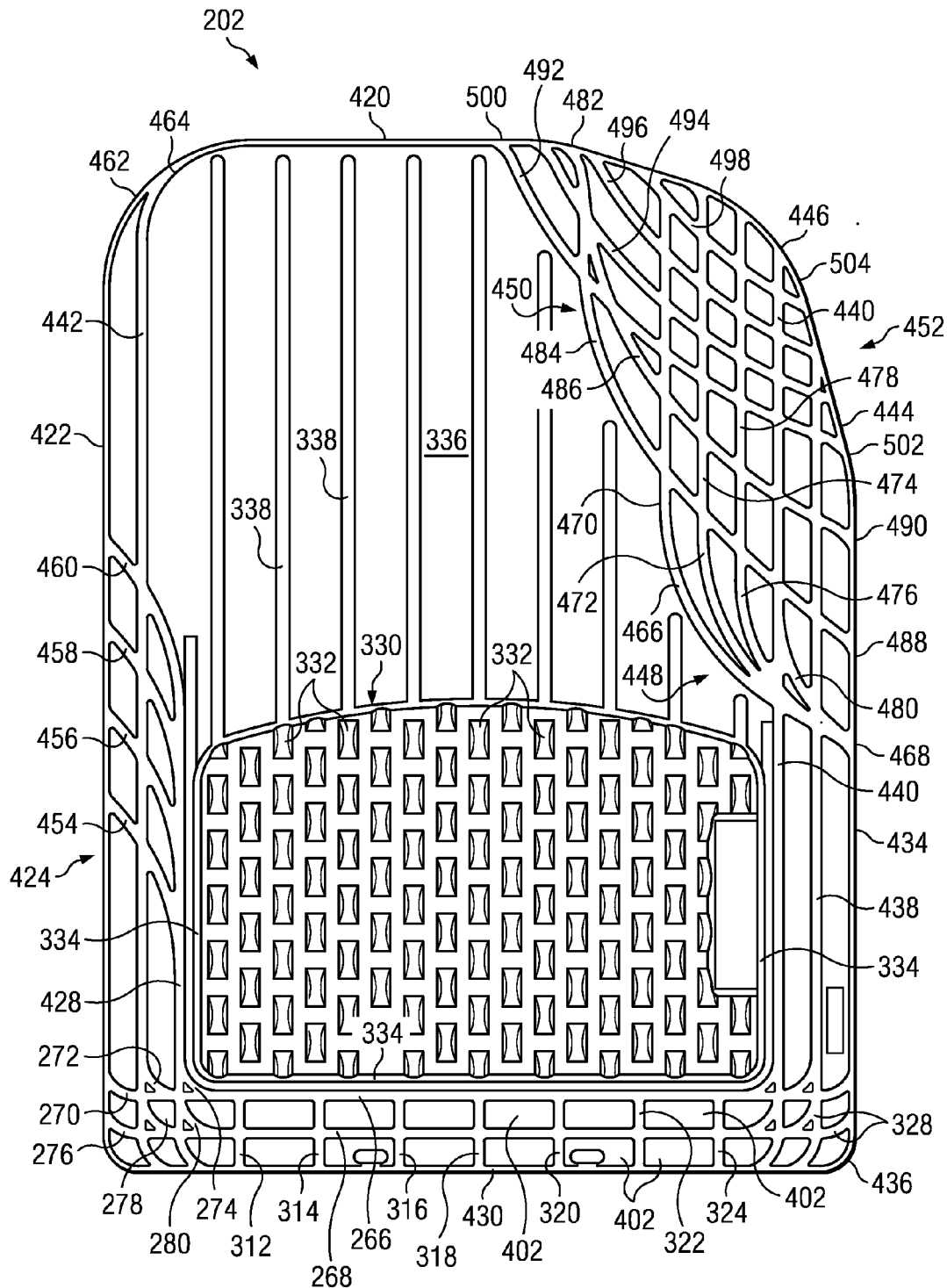
FIG. 4 is a plan view of a passenger's side floor mat shown in FIG. 2.

A detailed view of the corresponding passenger's side mat 202 is shown in FIG. 4. Near its aft margin 430, much of the structure of mat 202 is the same as that of mat 200, and this similar structure is identified with like characters. Also, like mat 200, mat 202 has a central reservoir area 330, eminences 332 inside of it which project upwardly from a generally flat surface of the reservoir area 330, and a fluid-retaining rib 334 surrounding three sides of it. But much of the remaining structure is different.

The family 424 of transmission tunnel bulge curved trim lines includes a first curved trim line 454 having an aft end which merges as a tangent with longitudinal trim line 428 at about five inches from aft margin 430, and a forward end which meets inboard margin 422 at about 10⅛ inches from the aft margin 430. Curved trim lines 456, 458 and 460 in this family meet longitudinal trim line 428 as tangents thereto at or forward from the junction of trim line 454 therewith. In the illustrated embodiment, the inboard ends of trim lines 456, 458 and 460 are spaced in a forward direction from the inboard end of trim line 454 by equally spaced 2.3 inch increments.

Inboard margin 422 terminates at its forward end with a convexly curved segment 462 that is very gradual, preferably having about a four inch radius of curvature. To cover the instance that trim line 442 is selected to make up all or a part of the inboard margin of the trimmed mat, trim line 442 terminates at its forward end with a curved segment 464 that preferably has about a 2¾ inch radius of curvature. Both curved segments 462 and 464 provide a greatly rounded corner at the inboard and forward corner of mat 202 in comparison with the rounded corners of mat 200 or the aft rounded corners of mat 202.

The wheel well curved trim line family 448 includes a first curved trim line 466 having an outboard end that preferably meets the outboard margin 434 at a point 468 about 11½ inches from the aft margin 430. Trim line 466 curves concavely in an inboard direction until it meets with a longitudinal trim line 470 disposed about five inches from the center of the mat 202. Trim line 472 starts from point 468, curves concavely in an inboard and forward direction until it meets a longitudinal straight trim line 474 that is spaced in an outboard direction from trim line 470 by about one inch. A trim line 476 also starts at outboard point 468, and curves concavely in an inboard and forward direction until it merges with a straight longitudinal trim line 478, spaced in an outboard direction from trim line 474 by another inch. Finally a curved trim line 480 likewise begins at point 468 and curves concavely in an inboard and forward direction until it merges with trim line 440, spaced outboard from trim line 478 by about one inch and from the outboard margin 434 by about two inches. The straight trim line segments 470, 474 and 478 each terminate at their forward ends by inwardly convexly curved segments so as to result in a rounded corner if these trim lines are selected in trimming the mat.

A second family 450 of curved trim lines all start at a forward end on margin 420 at a point 482, which in the illustrated embodiment is located about 2¾ inch from a longitudinal center of the mat 202. A small convexly curved segment at the forward margin 420 forms a rounded corner if either if the two curved trim lines 484, 486 are selected for trimming. The curved trim lines 484, 486 sweep out a larger concave area than the curve line family 448, and one or the other of them is selected where the intrusion of the passenger side wheel well is most severe. The inwardmost trim line 484 in this family sweeps in an aft and outboard direction to a point 488, which in the illustrated embodiment is about 14¼ inches from the aft margin 430. A shallower trim line 486 terminates at a point 490 on the outboard margin 434 which is about 17⅛ inches from the aft margin 430.

A third family 452 of these wheel well trim lines includes curved trim lines 492, 494, 496 and 498. Both the forward and outboard ends of these trim lines 492-498 are slightly convexly radiused so that if any of them is selected to form a part of the outer margin of the trimmed mat, there will be rounded rather than sharp corners. This family of trim line curves is preferably formed around a single center (not shown; located forwardly and in an outboard direction from the mat 202 itself) at different radii therefrom. The innermost trim line 492 starts at a forward end 500 which in the illustrated embodiment is about 1⅝ from the longitudinal centerline of mat 202, and ends at an outboard end 502 located in the illustrated embodiment about 19⅝ inches from the aft margin 430. Trim lines 494, 496 and 498 have upper ends spaced in an outboard direction from end 500 by preferably substantially uniform intervals which can be about 1⅛ in. The outboard ends of trim lines 494, 496 and 498 are similarly spaced from end 502 by similar intervals.

Outboard margin 434 and forward margin 420 are joined by a convexly curved segment 504 which has a very large radius, once again to accommodate the intrusion of wheel well structure which exists in most late-model vehicles. The intersection of curve families 448, 450 and 452 create a large number of cells which can therefore be individually selected to remain with or be trimmed off from the mat 202.

Figure 5:
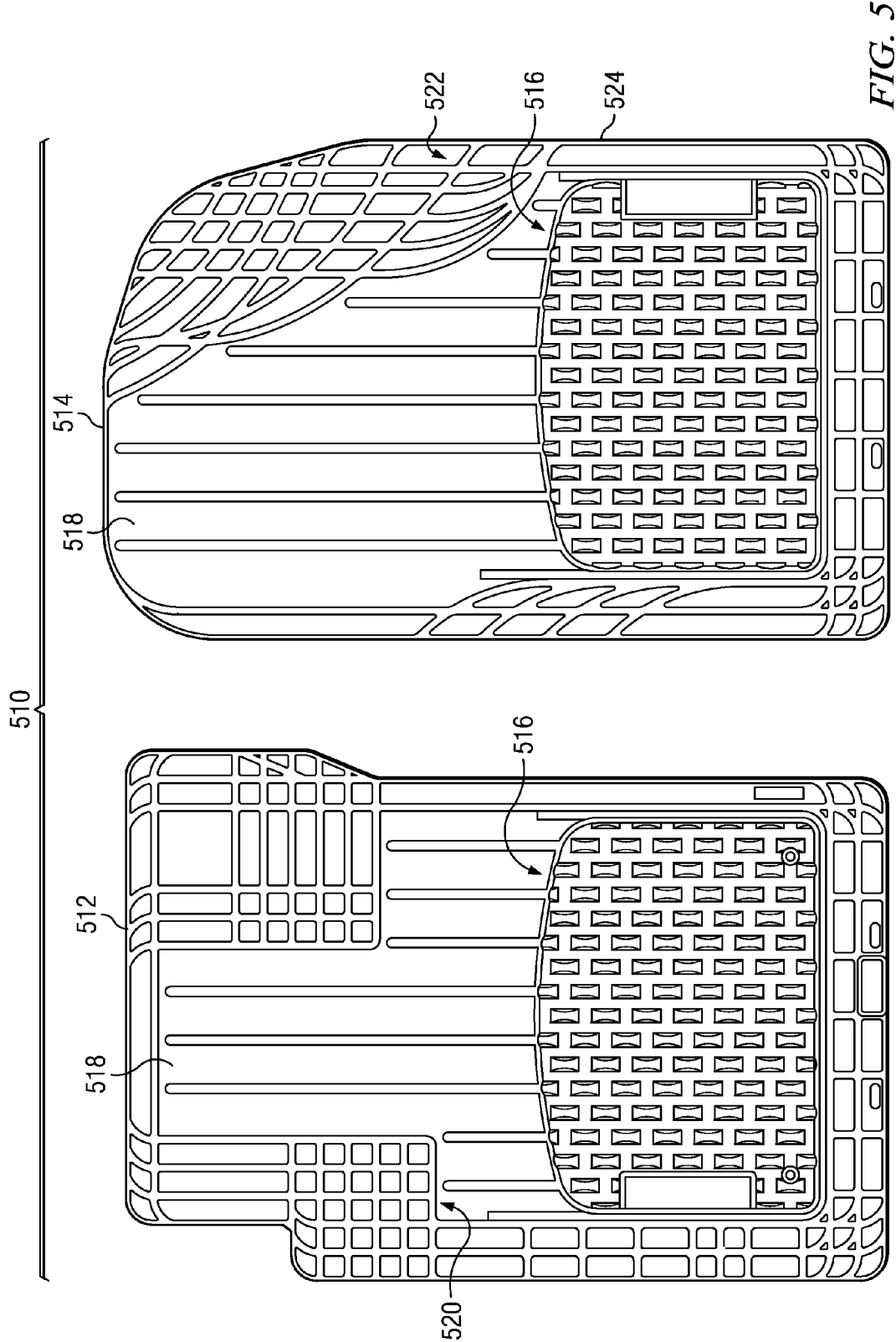
FIG. 5 is a plan view of an alternative embodiment of a pair of cut-to-fit vehicle floor mats according the invention.

FIG. 5 illustrates an alternative embodiment of the invention meant to be provided for a range of vehicles which aren't as wide as the range of vehicles optimally fit by the mats shown in FIGS. 2-4. This set 510 of mats includes a driver's side mat 512 and a passenger's side mat 514. A central reservoir 516 of each mat 512, 514 is less wide in a transverse direction than are the reservoirs 330 of mats 200, 202. Likewise, an unsegmented area 518 forward of the reservoir 516 is less wide than area 336 of mats 200, 202.

Most of the other structure found in mats 200, 202 have analogs in the mats 512, 514, however. Both mats may be trimmed on their forward, outboard, inboard and/or aft sides along the provided trim lines, as before. An array 520 of deadpedal cells in the driver's side mat 512 is one cell less wide than is array 226 of mat 200. On passenger's side mat 514, there is only one longitudinal column 522 of cells separating the outboard margin 524 from the reservoir 516, as opposed to two such columns in mat 202. The provided cells and trim lines are otherwise substantially identical.

In summary, driver's side and passenger's side cut-to-fit vehicle floor mats have been shown and described in which the driver's side and passenger's side mats are not bilaterally symmetrical or mirror-imaged, but rather intentionally differ in exterior margin and the number, length, positioning and shape of their trim lines. As trimmed by the consumer, the mats of the present invention can therefore more optimally fit to both the driver's side and passenger's side foot wells of a large number of late model vehicles.

While illustrated embodiments of the present invention have been described and illustrated in the appended drawings, the present invention is not limited thereto but only by the scope and spirit of the appended claims.

We claim:
1. A cut-to-fit floor mat for a vehicle foot well, comprising:
    an untrimmed mat body molded from a polymer and having an inboard margin, a forward margin, an outboard margin and an aft margin, a deadpedal notch formed at the intersection of the forward margin and the outboard margin of the untrimmed mat body;
    a plurality of trim lines formed in the untrimmed mat body as elongate indentations therein and including longitudinal trim lines and transverse trim lines; and
    a deadpedal array of cells formed by intersections of ones of the longitudinal trim lines and transverse trim lines, the array of cells being disposed adjacent to and inboard of the deadpedal notch such that the consumer may selectively trim away ones of the cells to fit a deadpedal of the vehicle foot well having one of a preselected plurality of widths.
2. The mat of claim 1, and further comprising:
    a second array of cells, spaced from the deadpedal array of cells, and disposed in the upper inboard quadrant of the mat and adaptable to be selectively removed by the consumer to accommodate a floor-mounted gas pedal; and a third array of cells disposed inboard of the second array of cells and adaptable to be selectively trimmed away by the consumer to fit a transmission tunnel indentation of the driver's side foot well.

3. The mat of claim 1, and further including a second array of cells disposed adjacent the aft margin of the mat body and adaptable to be selectively trimmed away by the consumer to accommodate a seat pedestal of the driver's seat.

4. The mat of claim 1 wherein the deadpedal array of cells is a two dimensional array.

5. The mat of claim 1, wherein a plurality of said longitudinal trim lines each terminate at its forward end in a convexly curved segment.

6. A cut-to-fit floor mat for a vehicle foot well, comprising:
an untrimmed mat body molded from a polymer and having an inboard margin, a forward margin, an outboard margin and an aft margin, a deadpedal notch formed at the intersection of the forward margin and the outboard margin of the untrimmed mat body;
a plurality of trim lines formed in the untrimmed mat body as elongate indentations therein and including longitudinal trim lines and transverse trim lines; and
a deadpedal array of cells formed by intersections of ones of the longitudinal trim lines and transverse trim lines, the array of cells being disposed adjacent to and aft of the deadpedal notch such that the consumer may selectively trim away ones of the cells to fit a deadpedal of the vehicle foot well having one of a preselected plurality of lengths.

7. The mat of claim 6, and further comprising:
a second array of cells, spaced from the deadpedal array of cells, and disposed in the upper inboard quadrant of the mat and adaptable to be selectively removed by the consumer to accommodate a floor-mounted gas pedal; and
a third array of cells disposed inboard of the second array of cells and adaptable to be selectively trimmed away by the consumer to fit a transmission tunnel indentation of the driver's side foot well.

8. The mat of claim 6, and further including a second array of cells disposed adjacent the aft margin of the mat body and adaptable to be selectively trimmed away by the consumer to accommodate a seat pedestal of the driver's seat.

9. The mat of claim 6 wherein the deadpedal array of cells is a two dimensional array.

10. The mat of claim 6, wherein a plurality of said longitudinal trim lines each terminate at its forward end in a convexly curved segment.

11. The mat of claim 6 wherein the deadpedal array of cells includes cells aft of the deadpedal notch and cells inboard of the deadpedal notch, such that the mat can be fit to a plurality of deadpedals having different widths and lengths.

* * * * *